United States Patent [19]

Ross

[11] Patent Number: 5,274,945
[45] Date of Patent: Jan. 4, 1994

[54] ILLUMINATED LINE FISHING APPARATUS

[76] Inventor: Rudolph Ross, 5733 S. Wolcott, Chicago, Ill. 60636

[21] Appl. No.: 890,557

[22] Filed: May 28, 1992

[51] Int. Cl.⁵ ............................................. A01K 93/00
[52] U.S. Cl. .................................... 43/17.5; 43/44.91
[58] Field of Search ...................... 43/17.5, 44.9, 44.91

[56]    References Cited
U.S. PATENT DOCUMENTS

| | | | |
|---|---|---|---|
| 2,825,175 | 3/1958 | Skvier | 43/44.91 |
| 3,672,087 | 6/1972 | Milburn | 43/44.91 |
| 3,760,527 | 9/1973 | Hamren | 43/44.91 |
| 4,501,564 | 2/1985 | Cairone, Sr. | |
| 4,649,660 | 3/1987 | Kurka et al. | |
| 4,693,030 | 9/1987 | Wohead | |
| 4,856,219 | 8/1989 | Severance et al. | |
| 4,879,831 | 11/1989 | Herrlich | |
| 5,119,578 | 6/1992 | Johnson | 43/17.5 |

OTHER PUBLICATIONS

Johnny Morris Bass Pro Shops Outdoor World 1992 Catalog, pp. 242-243.
Lunker Lights Packaging.

Primary Examiner—Kurt C. Rowan
Attorney, Agent, or Firm—David C. Brezina

[57] ABSTRACT

An illuminated fishing float for line fishing uses a tubular container for an illumination source of transparent elastomeric material telescoping into a supporting tube and having an end closure whereby the illumination source can be readily inserted, removed and replaced by detachment of the container and telescoped support tube.

19 Claims, 2 Drawing Sheets

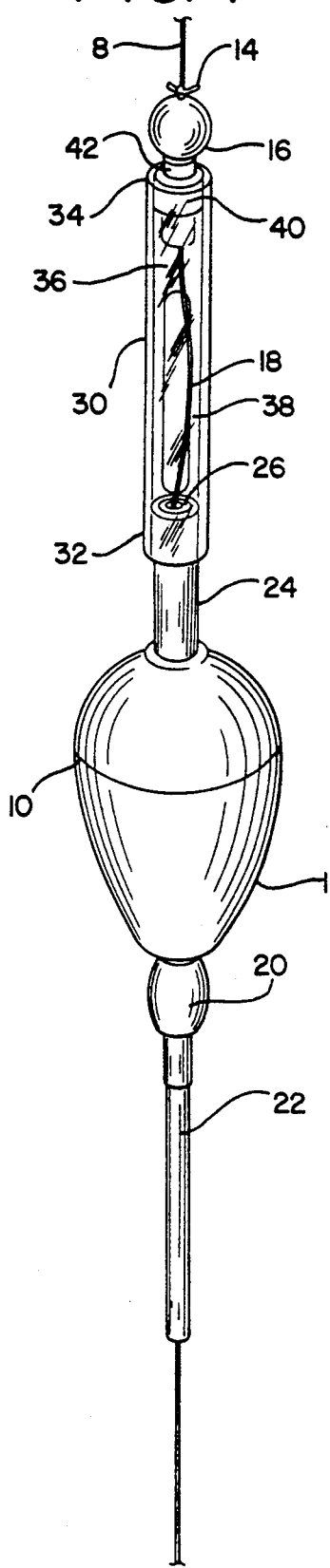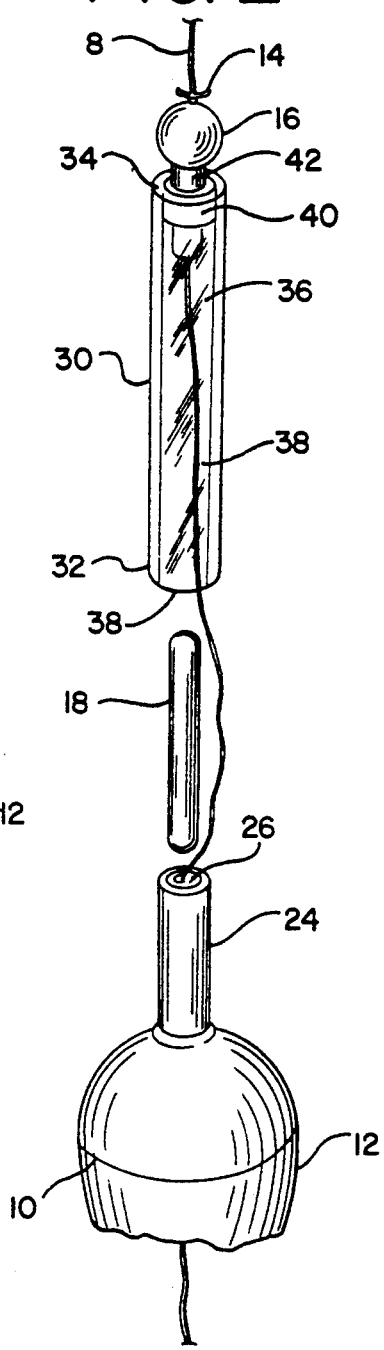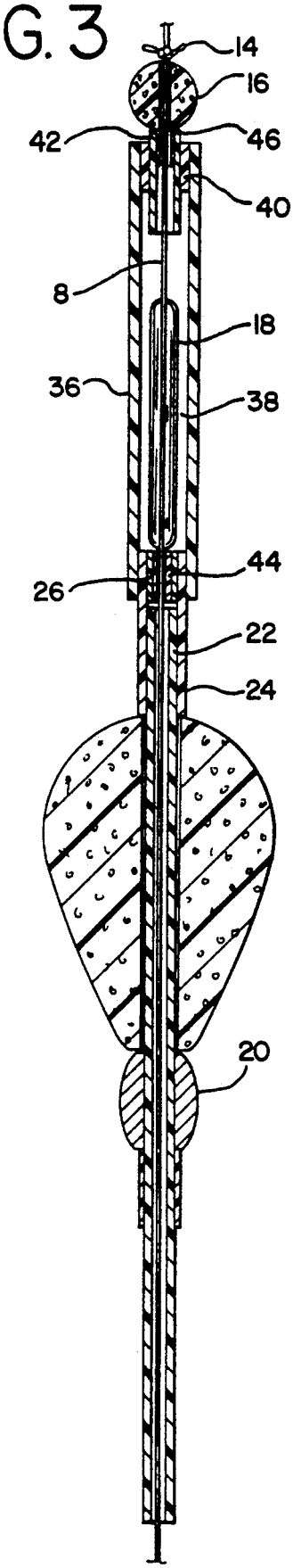

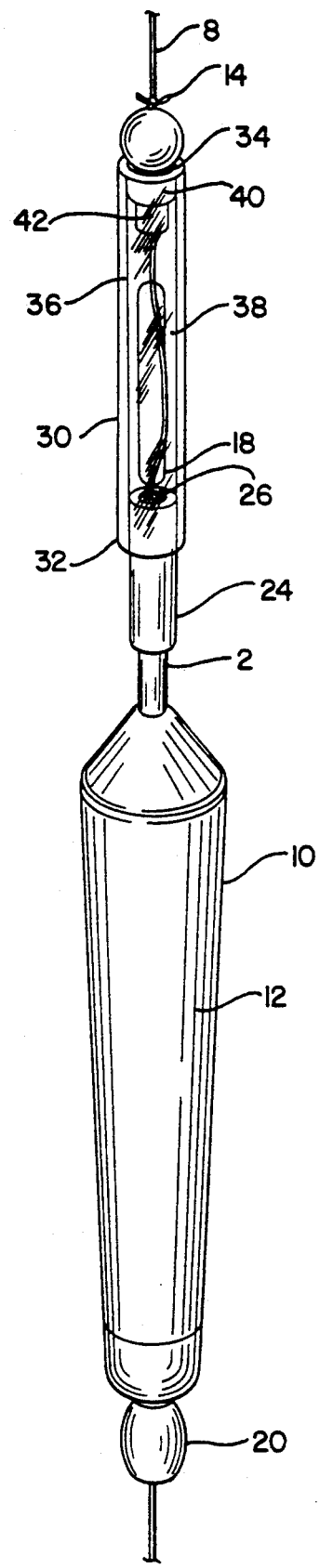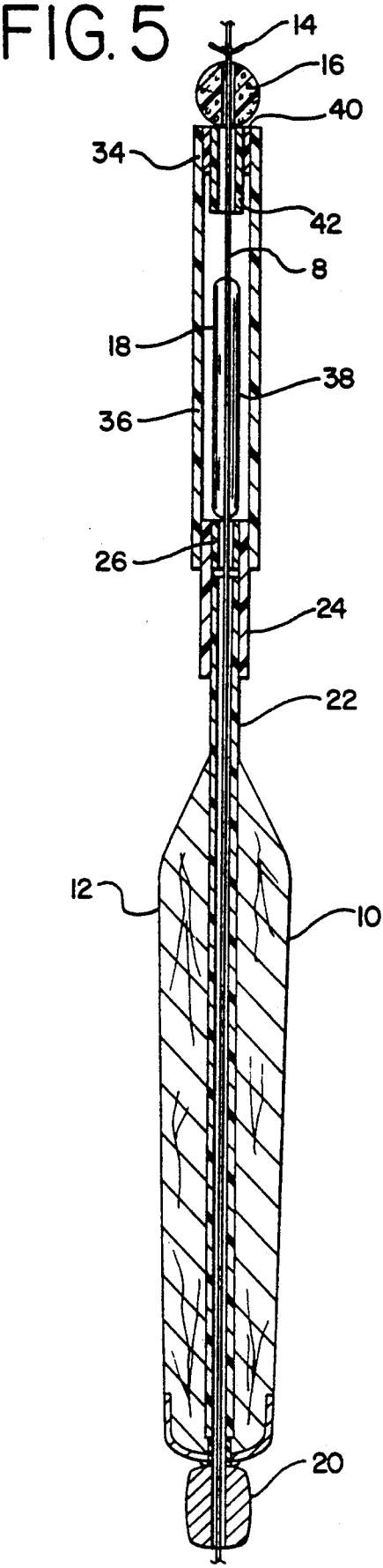

5,274,945

ILLUMINATED LINE FISHING APPARATUS

BACKGROUND OF THE INVENTION

1. Field of the Invention

The invention relates to illuminating apparatus attachable to a line fishing float providing for improved visibility and ease of insertion and replacement of an illuminating element generally a chemically luminescent cartridge.

2. Description of Related Art

The invention provides for a tubular container connected to the top of a fishing float and through which the fishing line passes enabling easy openability for insertion of an illuminating element or light source while eliminating the loss of critical components so long as the line remains in place. Prior art illuminated fishing floats involve elaborate structures prone to component loss when surfacing at night, electrically powered versions having surface requirements and mass adversely effecting float stability and sleeves with collars subject to unwanted disengagement.

SUMMARY OF THE INVENTION

The invention provides for a container having walls defining a chamber being connectable to the top portion of a fishing float and adapted to contain a light source. In the preferred embodiment various sizes of chemically luminescent cartridges can be used, however, the invention does not preclude use of alternative light sources such as a low power light emitting diode array of suitable size. The invention uses a series of concentric and telescopic tubes to interconnect the container to the float additionally providing physical support to not only support the container itself, but also resist loads imposed by the buoyancy of the float against a stopper or lock. The telescoping tubes are detachable while still retained on the line thereby permitting ease in replacement of a spent light source or removable for day fishing and insertion at night with minimal risk of loss of components, the line running through all tubes. Further added rigidity is provided in key areas through the use of substantially rigid but low friction tubes for improved performance.

BRIEF DESCRIPTION OF THE DRAWINGS

FIG. 1 is a perspective view of the invention in place on a fishing float.

FIG. 2 is a exploded view of the invention showing a light source replacement.

FIG. 3 is a sectional view of the invention on a fishing float.

FIG. 4 is a perspective view of the invention on an alternative fishing float.

FIG. 5 is a sectional view of the invention on an alternative fishing float.

DETAILED DESCRIPTION OF THE PREFERRED EMBODIMENT

A fishing line 8 extends through a float 10. The float 10 has buoyant body 12 supporting it and a lure at the end of the line. A line stopper 14 is placed on line 8 to provide resistance against line stopper bead 16 so that the lure may be suspended at a selected depth below the float. A light source 18 provides illumination so that the fishing person can observe the location and behavior of the float during night fishing.

Ballast 20 provides stability so that the float generally maintains a desired orientation to avoid fouling the line 8 and also provides sufficient stability to support the invention.

The float is adapted with a mast or stem 22 extending at least some distance above the body 12 and in the embodiment of the float shown in FIG. 1 through FIG. 3 extends below the body 12 as well.

A connector 24 engages mast 22 above body 12. Fitted interior connector 24 is reinforcement 26.

Container 30 has a first end 32 at the bottom and a second end 34 at the top. The first end 32 fits over connector 24. The container 30 includes a wall 36 which permits transmission of light therethrough.

At the second end 34, end closure 40 reduces the effective interior diameter of container 30. Interior closure 40 is line lead 42 with line 8 passing therethrough.

In the preferred embodiment a first ferrule or eyelet 44 is fitted to improve the strength of the structure at the first end 32. A second ferrule or eyelet 46 is fitted interior line lead 42 at second end 34 to additionally improve the rigidity of the structure at the second end 34. The ferrules or eyelets additionally provide for reduced friction as the line passes therethrough.

In operation it can be seen that fishing line 8 passes completely through float 10 extending beneath buoyant body 12 so that a lure can be suspended from line 8 in a position selectable through movement of line stopper 14 which bears against line stopper bead 16 thereby selecting a certain depth for the lure. The float 10 is maintained upright in the preferred embodiment by the placement of ballast 20 which provides a certain concentrated mass below the center of gravity of float 10 thereby imparting stability to maintain it in a vertical orientation.

The specific invention utilizes a float 10 having a mast 22 extending at least above and in the preferred embodiment above and below buoyant body 12. Connector 24 in the preferred embodiment is an elastomeric tube which is fit or deformed over mast 22 to provide a tight stretched fit thereby maintaining position thereof. In order to support the container 30 in the desired position above buoyant body 12, connector 24 is internally fitted with reinforcement 26. The interior diameter of connector 24 in its relaxed state is substantially the same or slightly less than reinforcement 26 so that the reinforcement can be forced in place thereby assuring a tight fit. In the preferred embodiment reinforcement 26 is composed of a substantially rigid material further having relatively smooth interior surface and having a relatively hard finish. This then provides for a bearing surface for line 8 as it passes therethrough and also adds rigidity to the structure comprised of the three (3) elements of mast 22, connector 24, and reinforcement 26.

Container 30 in the preferred embodiment is a substantially transparent elastomeric tube which permits light emitted by light source 18 to pass therethrough thereby illuminating the float 10 from a distance at night. Container 30 has a first end 32 and second end 34 opposite one another. First end 32 has an interior diameter substantially equal to the relaxed exterior diameter of connector 24. Since container 30 is substantially elastomeric and has a level of flexibility, it can be fit or deformed over the exterior of connector 24 for a substantially tight but manually removable fit. The wider diameter of container 30 further enables manual compression of the walls 36 to provide slight distention of end 32 facilitating attachment and removal to connector 24. This attachment and removal while line 8 runs through the entire assembly greatly facilitates operation in the desired night time condition because the container is easily manually removable yet because of the placement of the line, is hard to lose at night if it slips from the fisher person's grip under prevailing conditions of wetness.

End 34 has an internal end closure 40. In the preferred embodiment this is composed of substantially the same tubing as connector 24. The exterior and interior diameter values are also substantially the same relative to those of reinforcement 26 relative to container 30. The end closure provides two (2) functions that of reducing the effective diameter at end 34 and additional cross sectional resilient area because of the elastomeric materia used thereby facilitating fitment of line lead 42. In the preferred embodiment line lead 42 is a substantially rigid tube having a relatively hard smooth finish. This adds rigidity properties to the closure structure at end 34 but because closure 40 and lead 42 are fitted substantially entirely within the length of container 30, they are substantially more difficult to remove than the connection between connector 24 and end 32. The combined closure structure at end 34 both provides reduced friction and higher wearing aperture through which line 8 can pass as during fishing substantially all the wear will be concentrated at this point due to the directional changes of the line and the loads imposed as the float 10 bobs on the surface.

In the preferred embodiment ferrule 46 is fitted within line lead 42. Ferrule 44 is also adaptable to be fitted within reinforcement 26. While reinforcement 26 and lead 42 can be composed of a rigid plastic material in the preferred embodiment, the ferrules are more commonly metal. The diameter reducing properties of the structure enable the use of a minimal size and therefor mass ferrule while maximizing the friction and wear reducing properties provided thereby. The load provided by the buoyancy of float 10 upwardly as against the downward load generated on load 8 by a selected lure or bait is further borne by ferrule 46 in the preferred embodiment directly and through the entire perimeter structure of lead 42, closure 40, container 30, connector 24 to mast 22.

FIG. 4 and FIG. 5 show an alternative embodiment of the invention with an alternative configuration for buoyany body 12. As can be seen line 8 can bear directly on reinforcement 26 at end 32 and lead 42 at end 34 the ferrules 44 and 46 of FIG. 3 being eliminated. Further shown in FIG. 4 and FIG. 5 is the spacing of connector 24 on mast 22 some distance above buoyant body 12.

Various features of the invention have been particularly shown and described in connection with the illustrated embodiments of the invention, however, it must be understood that these particular arrangements merely illustrate, and that the invention is to be given its fullest interpretation within the terms of the appended claims.

In accordance with my invention, I claim:

1. An illuminated fishing float for a fishing line having a buoyant body, a line length stopper and a light source comprising:
   a tubular mast extending above said body;
   a tubular connector telescopingly attached to said mast;
   a tubular reinforcement fitted inside of said connector and above said mast;
   a tubular light source container having a first and second end, the first end being removably telescopingly attached to said connector, having a light transmitting wall defining a chamber for receiving said light source;
   a tubular end closure fitted inside of said container second end; and
   a tubular line lead fitted inside of said end closure, said line passing through each of said tubular elements.

2. The fishing float according to claim 1 and said container further comprising a cylindrical transparent member resiliently attachable and detachable by fitment over said connector.

3. The fishing float according to claim 2 and said connector further comprising a resilient and compressible member compressing during fitment of said container.

4. The fishing float according to claim 3 and said reinforcement further comprising a first substantially rigid member limiting compression of said connector, providing resistance against the bending of said connector and reducing friction to said line passing therethrough.

5. The fishing float according to claim 4 and said closure further comprising a resilient interior diameter reducing segment and a second substantially rigid member fitted in the segment limiting compression of said segment, providing resistance against bending of said and reducing friction to said line passing therethrough.

6. The fishing float according to claim 5 further comprising said first and second rigid members having hard and smooth ferrules fitted at the places where the line exists providing additional reduction of friction and resistance against chafing and abrasion.

7. An illuminated line fishing apparatus with a light emitter maintained above a buoyant body comprising:
   means for enabling passage of said line through said body rigidly extending above said body;
   means for containing said emitter within a wall, having a first and second end, permitting light transmission through said wall and the passage of said line between said ends;
   means for supporting said containing means by said first end on said body and providing for removal of said emitter, said line passing through said supporting means;
   means for closure of said second end for retention of said emitter in said container, said line passing through said closure means;
   said containing means further comprising a resilient and substantially transparent tube deformable to provide an interference fit with said supporting means and for removal therefrom;
   said supporting means further comprising
   a resilient support tube deformable to provide an interference fit on said passage means; and
   a rigid tubular reinforcement having a wall defining a passage and being inside of said support tube and retained in position by the deformation of said support tube over said reinforcement, the line passing through and bearing against the wall defining said passage.

8. An illuminated line fishing apparatus with a light emitter maintained above a buoyant body comprising;
   means for enabling passage of said line through said body rigidly extending above said body;

means for containing said emitter within a wall, having a first and second end, permitting light transmission through said wall and the passage of said line between said ends;

means for supporting said containing means by said first end on said body and providing for removal of said emitter, said line passing through said supporting means; and means for closure of said second end for retention of said emitter in said container, said line passing through said closure means;

said closure means further comprising:

a resilient closure tube deformable to provide an interference fit in said containing means; and a rigid tubular lead having a wall defining a passage and being inside of said closure tube and retained in position by the deformation of said closure tube over said lead, the line passing through and bearing against the wall defining said passage.

9. The fishing apparatus of claim 8; and
a metal ferrule being fitted inside of said lead.

10. The fishing apparatus of claim 9; and
a metal ferrule being fitted inside of said reinforcement.

11. An illuminated line fishing apparatus with a light emitter maintained above a buoyant body comprising;

means for enabling passage of said line through said body rigidly extending above said body;

means for containing said emitter within a wall, having a first and second end, permitting light transmission through said wall and the passage of said line between said ends;

means for supporting said containing means by said first end on said body and providing for removal of said emitter, said line passing through said supporting means; and means for closure of said second end for retention of said emitter in said container, said line passing through said closure means;

said containing means further comprising a resilient and substantially transparent tube deformable to provide an interference fit with said supporting means and for removal therefrom;

said supporting means being a resilient support tube deformable to provide an interference fit on said passage means with a rigid tubular reinforcement having a wall defining a passage and being inside of said support tube and retained in position by the deformation of said support tube over said reinforcement, the line passing through and bearing against the wall defining said passage; and said closure means being a resilient closure tube deformable to provide an interference fit in said containing means with a rigid tubular lead having a wall defining a passage and being inside of said closure tube and retained in position by the deformation of said closure tube over said lead, the line passing through and bearing against the wall defining said passage.

12. An illuminated fishing float for line fishing comprising:

a first tube containing an illumination source for transmittal of light and the passage of the line therethrough the first tube having first and second ends;

a second tube attaching the first tube to the float, in telescoped relationship to the first tube at the first end, closing said first end for containment of the illumination source, and the line passing through the second tube; and a third tube closing the second end of the first tube to retain the illumination source therein by telescopingly fitting in and reducing the diameter of the second end, and the line passing through the third tube.

13. The fishing float apparatus of claim 12 and said first tube being a substantially transparent elastomeric material resiliently deformable for removably fitting over said second tube and fitting over said third tube.

14. The fishing float apparatus of claim 13 and said second tube being an elastomeric material resiliently deformable for removably receiving said first tube.

15. The fishing float apparatus of claim 14 and said third tube being an elastomeric material resiliently deformable for fitting within said first tube.

16. The fishing float apparatus of claim 15 and a substantially rigid reinforcing tube being telescopingly fitted in said second tube, said second tube being resiliently deformed over said reinforcement.

17. An illuminated fishing float for line fishing comprising:

a first tube for containing a light source for transmittal of light and the passage of the line therethrough the first tube having first and second ends;

a second tube attaching the first tube to the float, in telescoped relationship to the first tube at the first end, and the line passing through the second tube;

a third tube closing the second end of the first tube to retain the light source therein by telescopingly fitting in and reducing the diameter of the second end, and the line passing through the third tube;

said second tube being an elastomeric material resiliently deformable for removably receiving said first tube;

said third tube being an elastomeric material resiliently deformable for fitting within said first tube;

a substantially rigid reinforcing tube being telescopingly fitted in said second tube, said second tube being resiliently deformed over said reinforcing tube; and a substantially rigid line lead being telescopingly fitted in said third tube, said third tube being resiliently deformed over said line lead.

18. An illuminated fishing float for line fishing comprising:

a first tube for containing the illumination source for transmittal of light and the passage of the line therethrough the first tube having first and second ends;

a second tube attaching the first tube to the float, in telescoped relationship to the first tube at the first end, and the line passing through the second tube; and a third tube closing the second end of the first tube to retain the illumination source therein by telescopingly fitting in and reducing the diameter of the second end, and the line passing through the third tube;

said first tube being a substantially transparent elastomeric material resiliently deformable for removably fitting over said second tube and fitting over said third tube;

said second tube being an elastomeric material resiliently deformable for removably receiving said first tube;

said third tube being an elastomeric material resiliently deformable for fitting within said first tube;

a substantially rigid reinforcing tube being telescopingly fitted in said second tube, said second tube being resiliently deformed over said reinforcement; and a substantially rigid line lead being telescopingly fitted in said third tube, said third tube being resiliently deformed over said line lead;

said first tube being a substantially transparent elastomeric material resiliently deformable for removably fitting over said second tube and fitting over said third tube;

said second tube being an elastomeric material resiliently deformable for removably receiving said first tube; and said third tube being an elastomeric material resiliently deformable for fitting within said first tube.

19. The fishing float apparatus of claim 18, and a substantially rigid reinforcing tube being telescopingly fitted in said second tube, said second tube being resiliently deformed over said reinforcement; and a substantially rigid line lead being telescopingly fitted in said third tube, said third tube being resiliently deformed over said line lead.

* * * * *